United States Patent
Toutonghi et al.

(10) Patent No.: US 7,945,535 B2
(45) Date of Patent: May 17, 2011

(54) AUTOMATIC PUBLISHING OF DIGITAL CONTENT

(75) Inventors: Michael J Toutonghi, Bellevue, WA (US); Jaroslav Bengl, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 407 days.

(21) Appl. No.: 11/302,566

(22) Filed: Dec. 13, 2005

(65) Prior Publication Data

US 2007/0294306 A1    Dec. 20, 2007

Related U.S. Application Data

(60) Provisional application No. 60/635,926, filed on Dec. 13, 2004.

(51) Int. Cl.
*G06F 17/00* (2006.01)

(52) U.S. Cl. ........ 707/665; 707/610; 707/640; 707/661; 707/662; 707/673; 707/674; 707/687; 707/803; 707/812; 707/822; 707/827; 348/207.99; 711/1; 713/176; 713/170; 713/181

(58) Field of Classification Search .................. 707/610, 707/640, 661, 662, 673, 674, 687, 803, 812, 707/822, 827, 999.009, 999.1, 999.2; 348/207.99; 711/1; 713/176, 170, 181
See application file for complete search history.

(56) References Cited

U.S. PATENT DOCUMENTS

| | | | | |
|---|---|---|---|---|
| 6,081,814 | A * | 6/2000 | Mangat et al. | 715/501.1 |
| 6,131,162 | A * | 10/2000 | Yoshiura et al. | 713/176 |
| 6,490,320 | B1 * | 12/2002 | Vetro et al. | 375/240.08 |
| 6,742,023 | B1 * | 5/2004 | Fanning et al. | 709/219 |
| 6,862,038 | B1 * | 3/2005 | Anderson | 348/207.99 |
| 2002/0023111 | A1 * | 2/2002 | Arora et al. | 707/513 |
| 2002/0087622 | A1 * | 7/2002 | Anderson | 709/203 |
| 2003/0061200 | A1 * | 3/2003 | Hubert et al. | 707/3 |
| 2003/0065590 | A1 * | 4/2003 | Haeberli | 705/27 |
| 2004/0008226 | A1 * | 1/2004 | Manolis et al. | 345/769 |
| 2004/0019610 | A1 * | 1/2004 | Burns | 707/104.1 |
| 2004/0054627 | A1 * | 3/2004 | Rutledge | 705/50 |
| 2004/0125148 | A1 * | 7/2004 | Pea et al. | 345/802 |
| 2004/0201702 | A1 * | 10/2004 | White | 348/207.99 |
| 2004/0205286 | A1 * | 10/2004 | Bryant et al. | 711/1 |
| 2005/0140791 | A1 * | 6/2005 | Anderson | 348/207.99 |
| 2005/0234864 | A1 * | 10/2005 | Shapiro | 707/1 |

* cited by examiner

*Primary Examiner* — Syling Yen
(74) *Attorney, Agent, or Firm* — Shook, Hardy & Bacon L.L.P.

(57) ABSTRACT

In one embodiment, there is provided a method for a media storage device to manage digital content. The method comprises determining if there is digital content to be categorized into one or more galleries; automatically categorizing said digital content into the one or more galleries; and for digital content categorized into a gallery with an auto-publish flag, sending at least one of said digital content and a derivative form of said digital content to a server.

30 Claims, 10 Drawing Sheets

GALLERY TABLE

| GALLERY_ID | GALLERY_NAME | PARENT_GALLERY_ID |
|---|---|---|
| 1 | MY PICTURES | |
| 2 | FAMILY PICTURES | 1 |
| 3 | CHILDREN'S PICTURES | 2 |
| 4 | VACATION PICTURES | 2 |
| 5 | WEDDING PICTURES | 2 |
| 6 | EUROPEAN PICTURES | 4 |

GALLERY TABLE

| GALLERY_ID | GALLERY_NAME | PARENT_GALLERY_ID |
|---|---|---|
| 1 | MY PICTURES | |
| 2 | FAMILY PICTURES | 1 |
| 3 | CHILDREN'S PICTURES | 2 |
| 4 | VACATION PICTURES | 2 |
| 5 | WEDDING PICTURES | 2 |
| 6 | EUROPEAN PICTURES | 4 |

*FIG. 4*

PUBLISH_GALLERY TABLE

| GALLERY_ID | PUBLISH FLAG | PUBLISH TO LOCATION |
|---|---|---|
|  |  |  |
|  |  |  |
|  |  |  |
|  |  |  |
|  |  |  |
|  |  |  |
|  |  |  |

*FIG. 6*

SAVE_TO TABLE

| GALLERY_ID | SAVE_TO FOLDER |
|---|---|
|  |  |
|  |  |
|  |  |
|  |  |
|  |  |
|  |  |
|  |  |
|  |  |
|  |  |
|  |  |

*FIG. 7*

UPDATE_FROM TABLE

| GALLERY_ID | UPDATE_FROM FOLDER |
|---|---|
|  |  |
|  |  |
|  |  |
|  |  |
|  |  |
|  |  |
|  |  |
|  |  |
|  |  |

*FIG. 8*

BACKUP_TO TABLE

| GALLERY_ID | BACKUP_TO FOLDER |
|---|---|
|  |  |
|  |  |
|  |  |
|  |  |
|  |  |
|  |  |
|  |  |
|  |  |
|  |  |
|  |  |

*FIG. 9*

AUTOMATIC PUBLISHING OF DIGITAL CONTENT

RELATED APPLICATIONS

This application claims the benefit of U.S. Provisional Application No. 60/635,926 filed on Dec. 13, 2004, the specification of which is hereby incorporated by reference.

FIELD OF THE INVENTION

Embodiments of the invention relate to publishing digital content.

BACKGROUND

There has been an explosion in the volume of digital content stored on media storage devices. As used herein, the term "media storage device" refers to an electronic device that may be used to store digital content. Examples of media storage devices include personal computers (PCs), personal digital assistants (PDAs), cellphones, etc. Further, the term "digital content" is intended to broadly refer to all content that may be stored in a memory of a media storage device. As such, examples of digital content include digital photographs, digital music files, digital video, and other multimedia content.

To further describe aspects of the present invention, the following description will refer in particular to digital content in the form of digital photographs. However, the references to digital photographs are intended to be non-limiting.

Because of the explosion in the volume of digital content being stored on media storage devices, it has become a challenge to manage the digital content, without frustration. For example, in the case of a user wishing to publish digital photographs on a personal website, each time the user takes a new digital photograph that the user wishes to publish on the website, the user has to perform several operations. Typically, the user has to first transfer the digital photograph from a media acquisition device, such as a digital camera, to the media storage device. Then the user may have to resize and compress the digital photograph so that it is suitable for transmission to the web server, and then the user has to transmit or upload the digital content to the web server. The user has to repeat these operations for each new digital photograph that the user wishes to upload to the website. It will be appreciated that having to repeat these operations can be time consuming, and thus annoying.

SUMMARY OF THE INVENTION

According to a first aspect of the invention, there is provided a method for managing digital content which includes: determining if there is digital content to be categorized into one or more galleries; automatically categorizing said digital content into the one or more galleries; and for digital content categorized into a gallery with an auto-publish flag, sending at least one of said digital content and a derivative form of said digital content to a server.

Automatically categorizing the digital content into galleries may include creating a structure, for example, a database structure, to map each item of digital content to a gallery.

The method may include preparing the digital content for publication before sending the digital content to the server.

In one embodiment, preparing the digital content may include compressing the digital content to facilitate transmission thereof to the server. In the case of digital photographs, compressing the digital photographs may include reducing a number of pixels used to represent the digital content.

In one embodiment, the scanning of the memory occurs periodically at intervals set by a user, or set by default.

In one embodiment, a gallery may be mapped to one or more "update from" memory locations such as, for example, folders. Thus, whenever new digital content is placed in a "update from" memory location, the new digital content is automatically categorized into the gallery to which the memory location is mapped.

In one embodiment, the original digital content may be kept in an uncompressed/untransformed form in its original memory location (hereinafter "first memory location"). However, a derivative form of the digital content may be stored in a second memory location. In one embodiment, the derived forms of digital content may include thumbnails, and other compressed versions of the original digital content.

In one embodiment, if the original digital content is deleted from the first memory location, then a user may be prompted to indicate whether the derivative form of the deleted content is also to be deleted. In one embodiment, the derivative form may be retained even though the original content may have been deleted. According to a second aspect of the invention, there is provided a method for publishing digital content using a media storage device, the method comprising: receiving the digital content from a media acquisition device; storing the digital content in a first memory location; and automatically sending the digital content to a server.

The method may include first authenticating a user of the media acquisition device before storing the digital content.

The method may include generating metadata associated with the digital content. In one embodiment, generating the metadata may include taking a time sample of the digital content and sending same to a remote server which uses the time sample to retrieve the metadata, which said remote server then transmits to the media storage device. The metadata may include, for example, cover art, artist name, genre, etc. or a thumbnail, preview, signature clip, etc., each of which is associated with the digital content. In one embodiment, the remote server uses the time sample to generate a signature for the digital content, which signature is then used to retrieve the metadata.

In another embodiment, generating the metadata may include calculating a signature for the digital content, and sending the signature to the remote server. The remote server can then retrieve the metadata associated with the digital content based on the signature and send said metadata to the media storage device.

The method may include storing the metadata in a second memory location of the media storage device.

The method may further include generating a derived form of the digital content and storing same in the second memory location. The derived form may include a compressed form of the digital content that is suitable for transmission to the server. In one embodiment, instead of sending the digital content to the server, only the derived form of the digital content is sent to the server.

BRIEF DESCRIPTION OF THE DRAWINGS

FIG. 4 shows a GALLERY table, in accordance with one embodiment of the invention;

FIG. 6 shows a PUBLISH_GALLERY table, in accordance with one embodiment of the invention;

FIG. 7 shows a SAVE_TO table, in accordance with one embodiment of the invention;

FIG. 8 shows an UPDATE_FROM table, in accordance with one embodiment of the invention;

FIG. 9 shows a BACK_UP TO table, in accordance with one embodiment of the invention.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Figure 1:
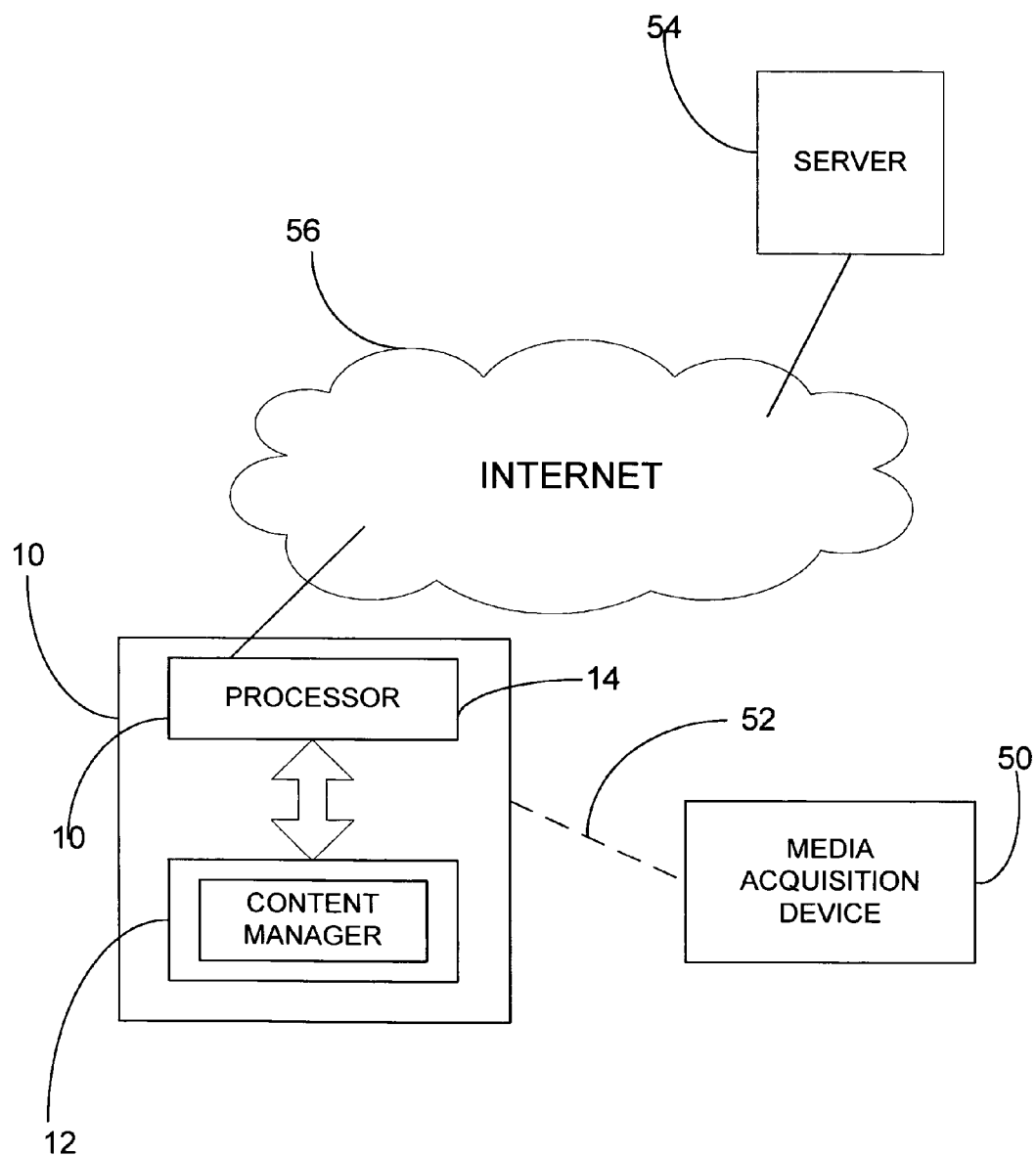
FIG. 1 shows a block diagram of a media storage device, in accordance with one embodiment of the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. FIG. 1 of the drawings shows a media storage device 10 in accordance with one embodiment of the invention. The media storage device 10 includes a memory 12 which is coupled to a processor 14. The media storage device 10 may include other components such as a display, one or more input devices such as a keyboard and a mouse, etc. It will be appreciated that the media storage device 10 may represent a wide range of devices such as a personal computer (PC), a personal digital assistant (PDA), a pocket PC, etc.

Figure 2:
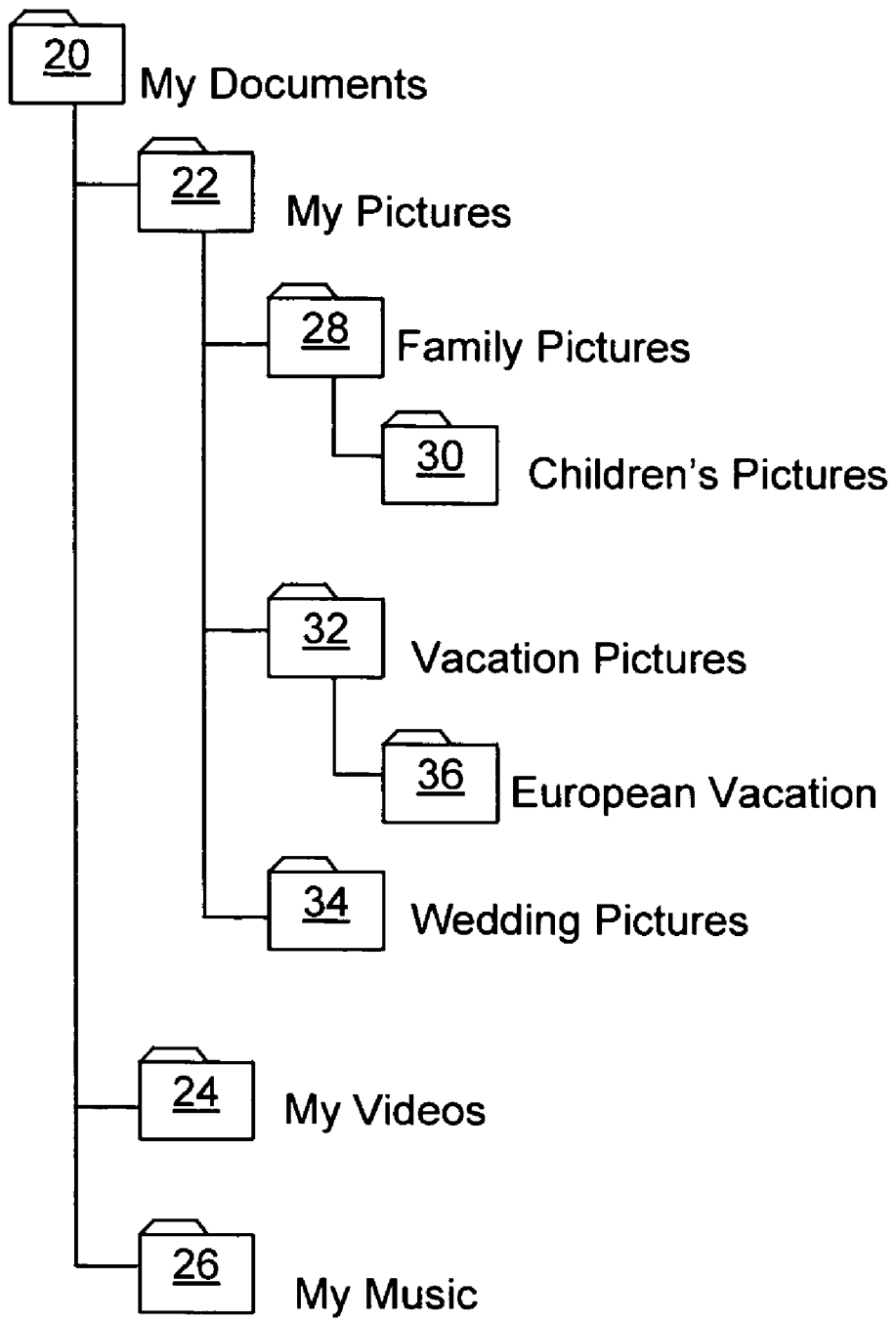
FIG. 2 shows an example of a representative folder structure for the media storage device of FIG. 1.

For the purpose of storing digital content, the memory 12 may be organized into folders. FIG. 2 of the drawings shows a representative example of a folder structure for the memory 12. Referring to FIG. 2, it will be seen that a "My Documents" folder 20 includes three subfolders viz. a "My Pictures" folder 22, a "My Music" folder 24, and a "My Videos" folder 26. The My Pictures folder 22 is for storing digital photographs, the My Music folder 24 is for storing digital music, and the My Videos folder 26 is for storing digital videos. The My Pictures folder 22 includes a "Family Pictures" subfolder 28. The Family Pictures subfolder 28 includes a "Children's Pictures" folder 30, a "Vacation Pictures" folder 32, and a "Wedding Pictures" folder 34. Further, the Vacation Pictures folder 32 includes a "European Vacation" folder 36.

The memory 12 includes a content manager 30 to facilitate management of digital content stored in the memory 12. In one embodiment, the content manager 30 may be implemented in software.

Figure 3:
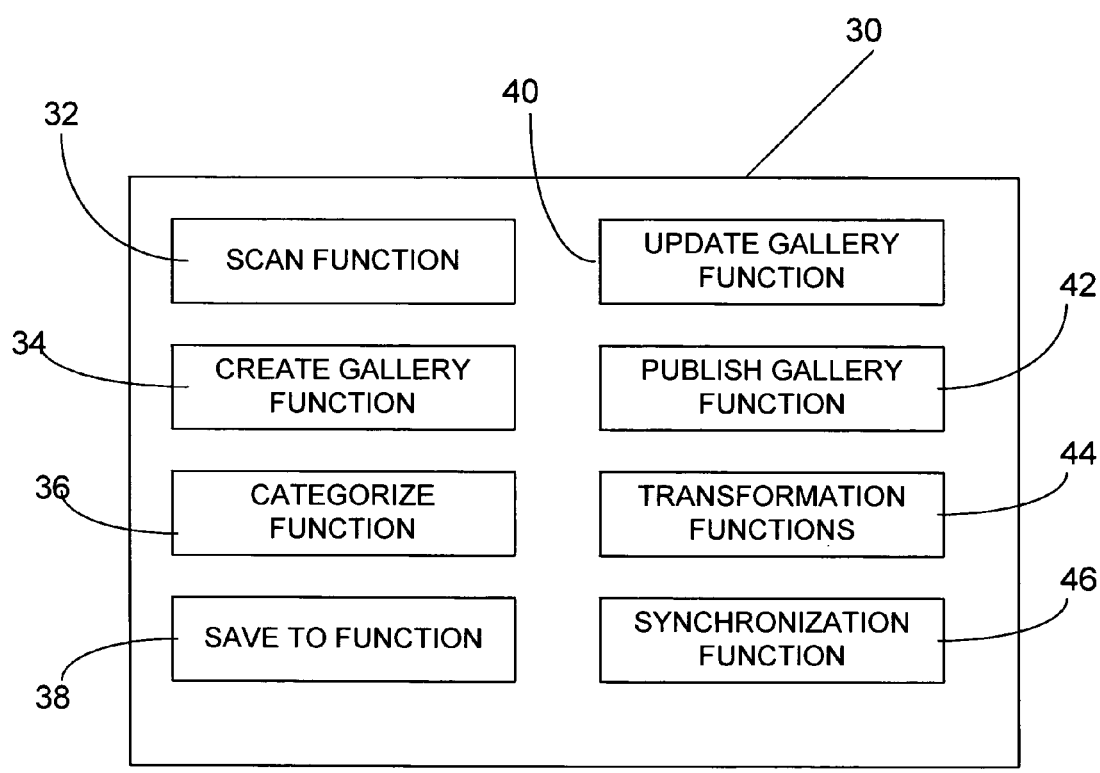
FIG. 3 shows a functional block diagram of some of the components of a content manager for the media storage device of FIG. 1, in accordance with one embodiment of the invention.

FIG. 3 of the drawings shows some of the functional components of the content manager 30. As will be seen, the content manager 30 includes a Scan function 32, a Create Gallery function 34, a Categorize function 36, a Save-To function 38, an Update Gallery function 40, a Publish Gallery function 42, a Transformation function 44, and a Synchronization function 46.

The Scan function 32 scans the memory 12 in order to identify digital content stored therein. In one embodiment, digital content stored in the memory 12 is identified by file extension names commonly used for digital content. For example, the file extension names .jpeg, .tiff, .pdf are commonly used to indicate images, therefore the scan function 32 will identify files with those file extension names as containing images. Since the file extension name .dss, .wav, .mp3 are commonly used to indicate audio content, the Scan function 32 will identify files with those extension names as containing audio digital content.

The Create Gallery function 34 has the ability to automatically create galleries. Galleries represent clusters, collections, or groupings of digital content, and afford a user great flexibility in organizing and managing digital content in a way that is independent of the memory location where the digital content may be stored. Each gallery may include associated metadata that is descriptive of the digital content in that gallery. As an example of how the use of a gallery can afford flexibility in organizing and managing digital content, consider a digital photograph that is stored in a "My Pictures" folder. The digital photograph, may, for example, be an image of an eagle taken during a user's recent trip to Africa. The user can associate or categorize the image of the eagle with one or more galleries to facilitate easy retrieval and sharing of the image. For example, the image can be categorized into a "Great Birds" gallery, a "My African Safari: gallery, or a "Wildlife" gallery. Regardless of how many galleries the image is classified into, it is still stored in the "My Pictures" folder. The content of each gallery can be shared (published) independently with different people based on an affinity of interests or any other relationship, thus providing great flexibility to a user on how to share images. In one embodiment, the Create Gallery function 34 creates a gallery based on the folder structure for the memory 12. For example, in one embodiment, a new gallery is created to correspond to each folder within the folder structure. Thus, referring to the folder structure of FIG. 2, a gallery is created to correspond to the My Pictures folder 22, a gallery is created to correspond to the Family Pictures folder 28, a gallery is created to correspond to the Children's Pictures folder 30, etc. In order to represent the galleries, the Create Gallery function 34 generates a GALLERY table. An example of a GALLERY table is shown in FIG. 4 of the drawings. As can be seen from FIG. 4, each gallery includes a unique gallery_ID (identifier), a gallery name and an optional parent gallery_ID. The GALLERY table of FIG. 4 shows a Children's Pictures gallery that has been created with gallery identifier 3, and parent gallery_ID of 2. The parent gallery_ID indicates that the Children's Pictures gallery is a sub-gallery of the Family Pictures gallery.

In one embodiment, instead of automatically generating the galleries, the galleries may be generated in response to user input. For this embodiment, a user may be presented with an interface which supports drag and drop functionality whereby a user is able to generate a gallery by simply dragging a graphical icon for a folder and dropping it into a graphical icon for a gallery. In response to the above-described dragging and dropping operation, a sub-gallery with the folder name corresponding with the folder whose graphical icon was dragged and dropped into the graphical icon for the gallery.

A user may associate key words with galleries, and the content manager 30 uses the key word to search metadata associated with digital content in the memory 12 in order to identify digital content to be categorized into galleries. Thus, in this embodiment, instead of scanning the memory 12 for digital content and identifying the digital content based on file extension names, the metadata may be used to identify digital content.

In another embodiment, the Create Gallery function 34 may create galleries based on an indication of the galleries in the form of metadata associated with digital content received from a media acquisition device such a mobile phone. In this embodiment, the galleries are first created on the media acquisition device and when digital content e.g. images are sent from the media acquisition device to the media storage device, an indication of a gallery in the form of metadata associated with the galleries is also sent to the media storage device.

In one embodiment, for new digital content stored in the media storage device, a change notification is generated by the content manager 30. In response to the change notification, the Create Gallery function 34 creates a new gallery if the metadata associated with the new digital content that produced the change notification indicates that no gallery corresponding to the metadata already exists.

The scanning of the memory 12 by the Scan function 32, and the generation of the change notification as described-above represent different embodiments of a step to determine if the memory 12 has digital content that is to be categorized into one or more galleries.

Figure 5:
FIG. 5 shows a CONTENT_ELEMENT table, in accordance with one embodiment of the invention.

The Categorize function 36 categorizes digital content found in the memory 12 into one or more of the galleries created by the Create Gallery function 34. Said categorization may be responsive to the above-described scanning or responsive to the above-described change notification. For categorizing the digital content, the Categorize function 36 generates a database table that maps each item of digital content to a particular gallery. One example of such a database table is the CONTENT_ELEMENT table shown in FIG. 5 of the drawings. In order to understand how the Categorize function 36 populates the CONTENT_ELEMENT table, assume that the Scan function 32 has identified a picture, of say the Eiffel Tower, which is stored in the memory 12 at location C./mydocuments/mypictures/vacationpictures/eiffeltower/jpg. The Categorize function 36 creates an entry in the CONTENT_ELEMENT table corresponding to the Eiffel Tower picture. For this entry, the Categorize function 36 inserts the full path name of the Eiffel Tower picture under the element_name column. The description column is an optional column and may be populated based on metadata associated with the Eiffel Tower picture, or by manual entry by the user. For the gallery_ID, the Categorize function 36 inserts a gallery_ID of "4" to indicate that the Eiffel Tower picture is mapped to the Vacation Pictures gallery. In one embodiment, the gallery_ID for a particular item of digital content may be determined based on metadata associated with that item. For example, a user may have a daughter named Anna and may have associated a metadata tag called "Anna" with digital photographs of Anna. For this example, in order to insure that photographs of Anna are categorized into the Children's Pictures folder, the user simply associates the key word "Anna" with a manually created gallery called "Anna" so that the content manager can automatically categorize digital photographs in the memory 12 with the metadata "Anna" in the folder "Anna". In another embodiment, the gallery_ID for a particular item of digital content may be determined based a location of the item of digital content in the memory 12. Thus, in the case of the Eiffel tower picture this picture is categorized into the Vacation Pictures gallery because it is located in a "Vacation Pictures" folder in the memory 12, and the "Vacation Pictures" folder is mapped or associated with the Vacation Pictures gallery. In one embodiment this mapping of memory locations/folders to galleries may be created automatically when the galleries are first created in accordance with the techniques described above.

In one embodiment, each gallery created by the Create Gallery function 34 may have a "publish flag" associated therewith to indicate whether a gallery is to publishable. In one embodiment, a user is prompted to enter input to indicate whether a particular gallery is to be published, and a location for the publishing. In one embodiment, a PUBLISH_GALLERY database table may be created in order to indicate whether a particular gallery is to be published or not, and to store information on the location for the publication. An example of a PUBLISH_GALLERY table is shown in FIG. 6 of the drawings. In one embodiment, the Scan function 32 may periodically scan the memory 12 for new digital content. The time period between scans can be user defined, or may be set by default. New digital content identified in any of the periodic scans are automatically categorized into existing galleries, or into new galleries that are created by the Create Gallery function 34.

In one embodiment, galleries may also be used by media acquisition devices in order to automatically save new content associated with galleries. As used herein, the term "media acquisition device", denotes any electronic device that may be used to acquire digital media/content. As such, examples of media acquisition devices include digital cameras, digital camcorders, voice recorders, cellphones, etc.

Referring again to FIG. 1 of the drawings, there is shown a media acquisition device 50 in the form of, for example a digital camera. The media acquisition device 50 is connected to the media storage device 10 by a communications path 52, which may be for example a serial cable, or a wireless communication path through, for example the Internet. A user may indicate to the media acquisition device 50 that new digital content should be stored in a particular gallery. In other words, the user manages digital content acquired by the media acquisition device 50 in terms of galleries as opposed to terms of folders. In one embodiment, the galleries may be created using an interface of the media acquisition device 50. In another embodiment, the galleries may be created by replicating corresponding galleries on the media storage device 10. For the creation of a new gallery on the media acquisition device 50, in one embodiment location information for the media acquisition device 50 is used. The location information may include a geographic location e.g. in the form of Global Positioning System (GPS) coordinates, or in the form of which transmitter/base station the media acquisition device 50 is currently connected to. Names may be given to particular locations. For example a location called "Home" may be mapped to particular GPS coordinates or may be selected as "active" for a connection with a particular transmitter/base location. In this case, the media acqistion device 50 may be configured to automatically categorize all images taken at the "Home" location into a "Home" gallery. In one embodiment, a database lookup may be used to determine the or each gallery that is mapped to a particular location. The database lookup may be performed by the media acquistion device 50 itself or by the media storage device 10 on its own or in conjunction with a web service.

In one embodiment, the media acquisition device 50 may categorize digital content into a gallery by determining an active gallery and automatically categorizing the digital content into the active gallery. An active gallery is any gallery that is set as active. For example, the user may be at an event such as a birthday party. The user may create a gallery for images relating to the event. By making the gallery for the event active, all images taken while at the event may be automatically categorized into that gallery.

Digital content sent by the media acquisition device 50 to media storage device 10 using the communications path 52 is received by the media storage device 10 and categorized by the Categorize function 36. In order to perform the categorization, in one embodiment, the Categorize function 36 uses metadata received from the media acquisition device 50. The metadata may in the form of keywords or tags describing the galleries associated with each item of digital content. In one embodiment, the Categorize function 36 creates entries in the CONTENT_ELEMENT table of FIG. 5. The actual digital content may be stored in the memory 12 using the SAVE_to function as will be described. In one embodiment, before storing the content, a user of the media acquisition device is first authenticated. To be authenticated, the user has to supply the correct login (e.g. username and password) information to publish content to a web service running on the server 54. The login information may be stored and used to access the web service when publishing content to the web service as is described below. In one embodiment the login information or a derivative thereof is received from the server 54 in encrypted form, for example in the form of an encryption/decryption key that may be used by the media storage device to decrypt authentication received from the media storage device. This embodiment is advantageous as a connection to the server 54 to authenticate the media acquisition device may not be available or may be too expensive e.g. if the media storage device is roaming outside its regular or home network.

Figure 7:
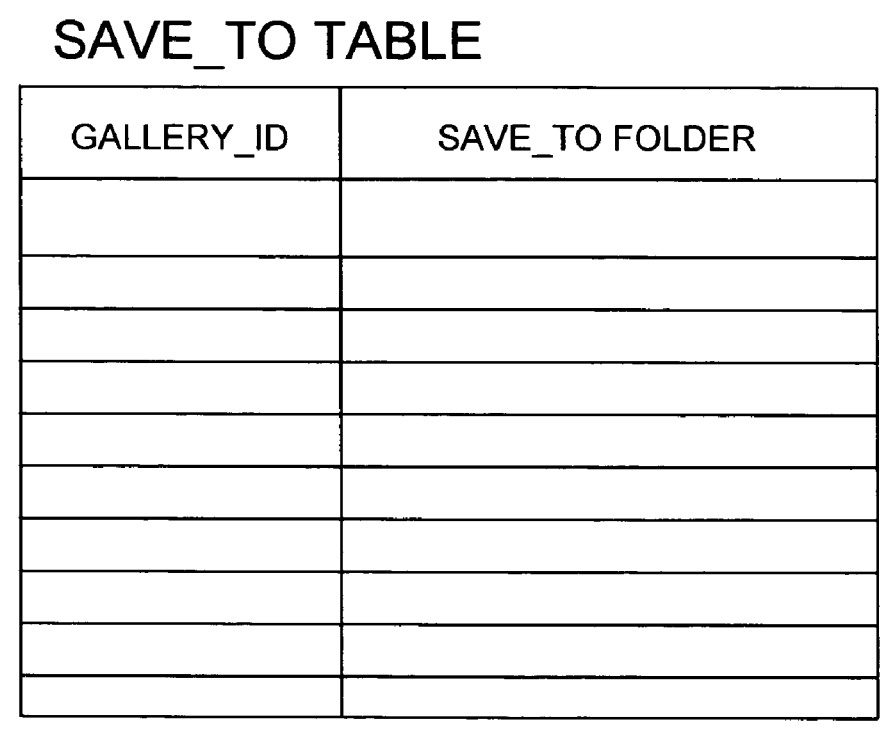

It is to be understood that a gallery is a categorization of content, and not the ultimate repository of content. Thus, in one embodiment, in order to identify a memory location at which to store content associated with a particular gallery, the Save_To function 38 generates a SAVE_TO table, such as is shown in FIG. 7. The SAVE_TO table maps a gallery to one or more Save_To folders. A Save_To folder is a folder in which content for a particular gallery is to be saved. Since the content manager 30, maps galleries to Save_To folders, a user can manage newly acquired digital content in terms of galleries without having to think about folders.

In one embodiment, in order to insure that new digital content in the folders is automatically categorized into one of more galleries, the Update Gallery function 40 generates a UPDATE_FROM table such as is shown in FIG. 8 of the drawings. The UPDATE_FROM table maps a gallery to one or more Update_from folders. An Update_from folder is a folder whose content is automatically categorized into a gallery mapped to the folder.

Referring now to FIG. 3 of the drawings, the Publish Gallery function 42 automatically publishes the digital content in each gallery for which the publish flag is set. Publishing a gallery includes transmitting the content categorized in each publishable gallery to its corresponding PUBLISH_TO location. For example, in one embodiment a PUBLISH_TO location may be the address of a web service running on a server 54, which is connected to the media storage device 10 via an intermediate wide area network 56 which may for example be the Internet (see FIG. 1 of the drawings). The web service may grant access to selected people (e.g. friends) with whom the published digital content is to be shared. The media storage device may transmit the digital content to the server 54 as a batch. For this embodiment, only when a predefined threshold is reached will transmission to the server 54 occur. For example, the predefined threshold may be defined in terms of an effluxion of time or in terms of a number or volume of items of digital content. Thus, transmission may occur only when a set period has elapsed since the last transmission, or only when the volume of digital content to be transmitted has reached a certain number.

In addition to sending the digital content as described above, in some embodiments, publishing the digital content may also include sending user-defined metadata tags associated with the digital content to the web service. The user-defined metadata tags may include information describing the or each gallery into which the digital content has been categorized into, as well as a description of the digital content itself. Advantageously, in one embodiment only metadata describing 1) a current gallery for digital content that is being published; 2) all hierarchical galleries that form a hierarchy of parent-child galleries starting with the current gallery and ending in the oldest parent gallery in the hierarchy; and 3) the digital content that is being published, is sent to the web service. In this embodiment, if the digital content is also classified in a further gallery that is not part of the hierarchy described above, then metadata describing the further gallery is not sent to the web service. The publishing of the metadata as described above can make the sharing of content thorough the web service more meaningful by providing information about the categorization of the of the content. For example, consider the case where digital content in the form of a digital photograph is categorized into a gallery called "My European Vacation"; into a gallery called "People I met in Paris"; and into a gallery called "Strange looking People". If the galleries "My European Vacation" and "People I met in Paris" are related as parent-and-child then metadata for these galleries will be published to the web service and shared. However, if the gallery "Strange Looking People" is not part of the hierarchy of parent-child galleries ending with the gallery "People I met in Paris" then metadata for this gallery will not be published to the web service, and hence not shared. This can be beneficial as a user may not wish metadata describing the "Strange Looking People" gallery from being shared.

In one embodiment, the Publish Gallery function 38 may transmit the digital content in raw or untransformed form. In another embodiment, the Publish Gallery function 42 transmits only a derivative form of the raw content. Derivative forms of the raw content are generated by the Transformation function 44, which generates derivative forms such as thumbnails, and other compressed versions of the raw digital content. In one embodiment, the Transformation function 44 may generate previews for the raw digital content.

The transformed or derived form of the raw digital content generated by the Transformation function 44 is stored in a back_up folder associated with each gallery. In one embodiment, the Create Gallery function 34 generates a BACK-UP_TO table such as is shown in FIG. 9 of the drawings, to map each gallery to a particular back_up folder. In one embodiment, the CONTENT_ELEMENT table of FIG. 5 may include a column for pointers to the derived forms of raw digital content and other metadata.

It will be appreciated, that by transmitting the transformed or derived content to the web service, as opposed to the raw content, there may be savings in terms of the amount of bandwidth that is consumed during the transmission. For example, the transformed content may have a reduced size, in terms of megapixels, thus leading to a saving in bandwidth consumptions during transmission thereof.

Using the above-described techniques, digital content may be stored in galleries on the media acquisition device 50, on the media storage device 10, and on the server 54. For purposes of sharing the digital content each gallery on the media acquisition device 50, may be linked or mapped to a corresponding gallery on the media storage device 10, and to a corresponding gallery on the server 54. Usually, corresponding galleries have the same or similar names, although this need not be the case. Sometimes, a user, having initially categorized an item of digital content into one gallery may wish to rename that gallery. In one embodiment, despite that change in gallery name, the link between with the corresponding galleries on the media storage device 10, and on the server 54, is still preserved through the use of a Globally Unique Identifier (GUID) that is assigned to the corresponding galleries on the media acquisition device 50, on the media storage device 10, and on the server 54. For this embodiment, the media storage device 10, and the server 54, identifies a gallery based on the GUID for the gallery and not on the name of the gallery.

Thus far, the metadata that has been described has relevance that is unique or peculiar to a user. This type of metadata will be referred to as custom-metadata for descriptive convenience. However, in some embodiments metadata for a particular item of digital content may be universal (hereinafter referred to as "universal metadata"). Examples of unique metadata include, cover art, artist name, genre, etc. or a thumbnail, preview, signature clip, etc., each of which is associated with an item of digital content. In one embodiment, the media storage device 10 generates universal metadata for the digital content. In one embodiment, the universal metadata may be generated by taking a time sample of each item of digital content and sending same to a server (e.g. the server 54) which uses the time sample to retrieve the universal metadata. The server then transmits the universal metadata to the media storage device. In one embodiment, the server uses the time sample to first generate a signature for the digital content, which signature is then used to retrieve the universal metadata. In another embodiment, the media storage device 10 generates the universal metadata by first calculating a signature for each item of digital content. The signature is then sent to the server. The server retrieves the universal metadata associated with the item of digital content based on the signature and sends said universal metadata to the media storage device. The media storage device 10 may store the universal metadata in the memory 12.

In one embodiment the media storage device 10 generates a derived form of the digital content and stores same in the memory 12. The derived form may include a compressed form of the digital content that is suitable for transmission to the server. In one embodiment, instead of sending the digital content to the server, only the derived form of the digital content is sent to the server.

The Synchronization function 46 facilitates the synchronization of digital content in a folder with the categorization of the digital content in a gallery mapped to the folder. For example, if a photograph is deleted from a particular folder, then the Synchronization function 46 detects that the photograph has been deleted, and presents an option to a user to either delete the photograph from its corresponding gallery, or to keep the photograph in the gallery, even though the photograph has been deleted from its original folder. In one embodiment, the Synchronization function 46, may upon deletion of a photograph from a publishable gallery, send a message to a server on which the gallery is published, to indicate that the photograph has been deleted. The server may include software to then also delete the photograph from the server. Thus, it is possible to synchronize digital content stored in a memory 12 with corresponding digital content stored in one or more servers.

Embodiments of the present invention have been described with reference to particular database tables. However, one in the skilled in the art will appreciate that various database schemas may be used to implement techniques of the present invention, and that the tables described herein, are intended to be non-limiting.

Figure 10:
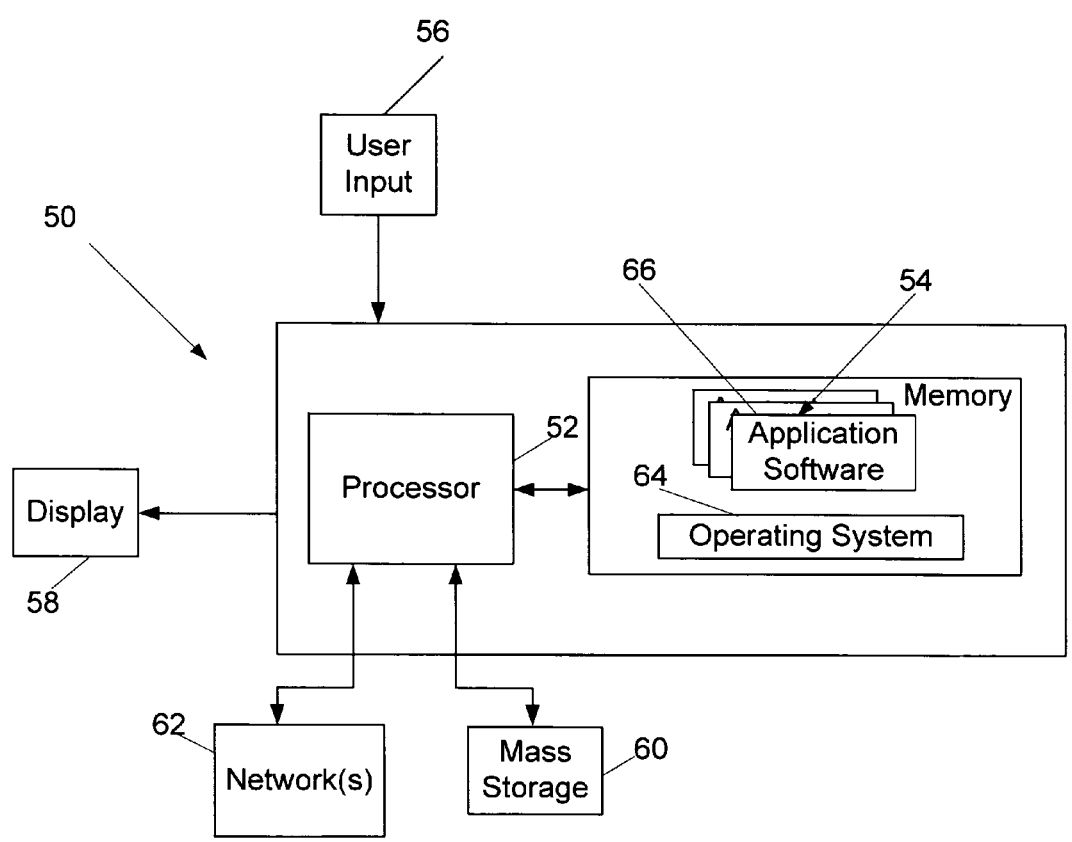
FIG. 10 shows a block diagram of hardware that may be used to implement the media storage device and the media acquisition device in accordance with one embodiment of the invention.

FIG. 10 shows hardware 50 that may be used to implement the media storage device and the media acquisition device in accordance with one embodiment of the invention. The hardware 50 typically includes at least one processor 52 coupled to a memory 54. The processor 52 may represent one or more processors (e.g., microprocessors), and the memory 54 may represent random access memory (RAM) devices comprising a main storage of the hardware 50, as well as any supplemental levels of memory e.g., cache memories, non-volatile or back-up memories (e.g. programmable or flash memories), read-only memories, etc. In addition, the memory 54 may be considered to include memory storage physically located elsewhere in the hardware 50, e.g. any cache memory in the processor 52, as well as any storage capacity used as a virtual memory, e.g., as stored on a mass storage device 60.

The hardware 50 also typically receives a number of inputs and outputs for communicating information externally. For interface with a user or operator, the hardware 50 may include one or more user input devices 56 (e.g., a keyboard, a mouse, etc.) and a display 58 (e.g., a Cathode Ray Tube (CRT) monitor, a Liquid Crystal Display (LCD) panel).

For additional storage, the hardware 50 may also include one or more mass storage devices 60, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 50 may include an interface with one or more networks 62 (e.g., a local area network (LAN), a wide area network (WAN), a wireless network, and/or the Internet among others) to permit the communication of information with other computers coupled to the networks. It should be appreciated that the hardware 50 typically includes suitable analog and/or digital interfaces between the processor 52 and each of the components 54, 56, 58 and 62 as is well known in the art.

The hardware 50 operates under the control of an operating system 64, and executes various computer software applications 66, components, programs, objects, modules, etc. (e.g. a program or module which performs operations described above) to perform other operations described with reference to FIGS. 1 through 9. Moreover, various applications, components, programs, objects, etc. may also execute on one or more processors in another computer coupled to the hardware 50 via a network 62, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

The invention claimed is:

1. A method for a media storage device to manage digital content, the method comprising:
   determining if there is digital content to be categorized into one or more galleries by periodically scanning a memory of the media storage device to identify said digital content;
   automatically categorizing said digital content into the one or more galleries based on global positioning data associated with said digital content, wherein the one or more galleries are not an ultimate repository of the digital content, and wherein the one or more galleries are collections of digital content;
   for the digital content categorized into a gallery wherein the gallery is associated with an auto-publish flag, sending, without user intervention, at least one of said digital content and a derivative form of said digital content to a server, thereby automatically publishing the digital content added to the gallery with the auto-publish flag; and
   subsequent to categorizing the digital content to the one or more galleries, storing the digital content in a memory location that is selected by looking up the memory location in a table that associates galleries with memory locations, thereby automatically assigning the memory location based on the one or more galleries associated with the digital content.

2. The method of claim 1, wherein determining if there is digital content to be categorized into the one or more galleries is based on a change notification which indicates that there is digital content to be categorized into the one or more galleries.

3. The method of claim 1, further comprising first generating the galleries.

4. The method of claim 3, wherein the galleries are generated automatically based on an organization of the memory.

5. The method of claim 3, wherein the galleries are generated in response to user-input through a drag and drop interface.

6. The method of claim 3, wherein the galleries are created through a user interface on the media acquisition device and are generated on the media storage device in response to an indication of the galleries received from the media acquisition device.

7. The method of claim 1, wherein automatically categorizing the digital content into galleries comprises mapping each item of digital content to a gallery.

8. The method of claim 7, wherein the mapping is based on metadata associated with the item of digital content.

9. The method of claim 7, wherein the mapping is based on a location of the item of digital content in the memory.

10. The method of claim 1, further comprising preparing the digital content for publication before sending the digital content to the server.

11. The method of claim 10, wherein preparing the digital content for publication comprises compressing the digital content to facilitate transmission thereof to the server.

12. The method of claim 1, further comprising removing an item of digital content from a gallery if the item of digital content is deleted from the memory.

13. The method of claim 1, wherein an individual gallery is associated with a proximity to a specific location that is matched to the global positioning data.

14. The method of claim 1, wherein the method further comprises:
   receiving an instruction to delete the digital content from the gallery associated with the auto-publish flag; and
   sending a message to the server on which the gallery is published, to indicate the digital content has been deleted, wherein the server deletes the digital content in response to the message, thereby synchronizing content between the gallery on the media storage device and the server.

15. The method of claim 1, wherein the gallery is a categorization of content and not the ultimate repository of the content and wherein the memory is the ultimate repository of the content.

16. One or more computer-readable storage media having computer-executable instructions embodied thereon, that when executed by a computing device performs a method for a media storage device to manage digital content, the method comprising:
   determining if there is digital content to be categorized into one or more galleries by periodically scanning a memory of the media storage device to identify said digital content;
   automatically categorizing said digital content into the one or more galleries based on global positioning data associated with said digital content, wherein the one or more galleries are not an ultimate repository of the digital content, and wherein the one or more galleries are collections of digital content;
   for the digital content categorized into a gallery wherein the gallery is associated with an auto-publish flag, sending, without user intervention, at least one of said digital content and a derivative form of said digital content to a server, thereby automatically publishing the digital content added to the gallery with the auto-publish flag; and
   subsequent to categorizing the digital content to the one or more galleries, storing the digital content in a memory location that is selected by looking up the memory location in a table that associates galleries with memory locations, thereby automatically assigning the memory location based on the one or more galleries associated with the digital content.

17. The media of claim 16, wherein determining if there is digital content to be categorized into the one or more galleries is based on a change notification which indicates that there is digital content to be categorized into the one or more galleries.

18. The media of claim 16, further comprising first generating the galleries.

19. The media of claim 18, wherein the galleries are generated automatically based on an organization of the memory.

20. The media of claim 18, wherein the galleries are generated in response to user-input through a drag and drop interface.

21. The media of claim 18, wherein the galleries are created through a user interface on the media acquisition device and are generated on the media storage device in response to an indication of the galleries received from the media acquisition device.

22. The media of claim 16, wherein automatically categorizing the digital content into galleries comprises mapping each item of digital content to a gallery.

23. The media of claim 22, wherein the mapping is based on metadata associated with the item of digital content.

24. The media of claim 22, wherein the mapping is based on a location of the item of digital content in the memory.

25. The media of claim 16, further comprising preparing the digital content for publication before sending the digital content to the server.

26. The media of claim 25, wherein preparing the digital content for publication comprises compressing the digital content to facilitate transmission thereof to the server.

27. The media of claim 16, further comprising removing an item of digital content from a gallery if the item of digital content is deleted from the memory.

28. The media of claim 16, wherein an individual gallery is associated with a proximity to a specific location that is matched to the global positioning data.

29. The media of claim 16, wherein the method further comprises:

receiving an instruction to delete the digital content from the gallery associated with the auto-publish flag; and sending a message to the server on which the gallery is published, to indicate the digital content has been deleted, wherein the server deletes the digital content in response to the message, thereby synchronizing content between the gallery on the media storage device and the server.

30. The media of claim 16, wherein the gallery is a categorization of content and not the ultimate repository of the content and wherein the memory is the ultimate repository of the content.

* * * * *